United States Patent [19]

De Jong et al.

[11] Patent Number: 5,720,901
[45] Date of Patent: Feb. 24, 1998

[54] PROCESS FOR THE CATALYTIC PARTIAL OXIDATION OF HYDROCARBONS

[75] Inventors: Krijn Pieter De Jong; Ronald Jan Schoonebeek; Koert Alexander Vonkeman, all of Amsterdam, Netherlands

[73] Assignee: Shell Oil Company, Houston, Tex.

[21] Appl. No.: 361,359

[22] Filed: Dec. 21, 1994

[30] Foreign Application Priority Data

Dec. 27, 1993 [EP] European Pat. Off. ............... 93203703

[51] Int. Cl.$^6$ ...................................................... C07C 1/02
[52] U.S. Cl. .......................................................... 252/373
[58] Field of Search ............................................... 252/373

[56] References Cited

U.S. PATENT DOCUMENTS

| | | | |
|---|---|---|---|
| 4,927,857 | 5/1990 | McShea, III et al. | 252/373 |
| 5,087,271 | 2/1992 | Stellaccia et al. | 252/373 |
| 5,149,464 | 9/1992 | Green et al. | 252/373 |
| 5,250,083 | 10/1993 | Wolfenbarge et al. | 252/373 |
| 5,252,609 | 10/1993 | Pinto | 518/703 |

FOREIGN PATENT DOCUMENTS

| | | | |
|---|---|---|---|
| 0 303 438 | 2/1989 | European Pat. Off. | 3/38 |
| 0262 947 B1 | 6/1992 | European Pat. Off. | |
| 92/11199 | 7/1992 | WIPO | 3/40 |

OTHER PUBLICATIONS

"Catalytic Partial Oxidation of Methane Over a Monolith Supported Catalyst," Hockmuth, Applied Cat B: Environ., 1 (1992) 89–100.

"Partial Oxidation of Methane to Synthesis Gas, and Carbon Dioxide as an Oxidizing Agent for Methane Conversion," Vernon et al, Cat Today, 13 (1992) 417–426.

"Synthesis Gas Formation by Direct Oxidation of Methane over Pt. Monoliths," Hickman et al, Journal of Catalysis 138, 267–282, 1992.

"Catalytic Conversion of Methane to Synthesis Gas over Europium Iridate, $Eu_2IR_2O_7$," Jones et al, Cat Letters 8 (1991) 169–174.

"Partial Oxidation of Methane to Synthesis Gas," Vernon et al, Catalysis Letters 6 (1990) 181–186.

"Selective Oxidation of Methane to Synthesis Gas Using Transition Metal Catalysts," Ashcroft et al, Nature, vol. 344, No. 6264, pp. 319–321, Mar. 22, 1990.

*Primary Examiner*—Werren B. Lone

[57] ABSTRACT

This invention concerns a process for the catalytic partial oxidation of a hydrocarbon feedstock. The process comprises contacting a feed mixture comprising the hydrocarbon feedstock and an oxygen-containing gas, which feed mixture also comprises nitrogen, with a catalyst capable of catalyzing the partial oxidation of the hydrocarbon feedstock, wherein the feed mixture also comprises a sulfur-containing compound. This process allows sulfur-containing hydrocarbon feedstocks to be processed without first undergoing a sulfur removal treatment. Accordingly, a process for the preparation of carbon monoxide and/or hydrogen from a hydrocarbon feedstock comprises subjecting the hydrocarbon feedstock in a first stage to a catalytic partial oxidation process as described above and subjecting at least a portion of the product of the first stage in a second stage to a desulfurization process.

14 Claims, 1 Drawing Sheet

PROCESS FOR THE CATALYTIC PARTIAL OXIDATION OF HYDROCARBONS

FIELD OF THE INVENTION

The present invention relates to a process for the catalytic partial oxidation of hydrocarbons, in particular to a process for the preparation of a mixture of carbon monoxide and hydrogen from methane, natural gas, associated gas or other sources of light hydrocarbons.

BACKGROUND OF THE INVENTION

The partial oxidation of hydrocarbons, for example methane or natural gas, in the presence of a catalyst is an attractive route for the preparation of mixtures of carbon monoxide and hydrogen, known in the art as synthesis gas. The partial oxidation of a hydrocarbon is a highly exothermic reaction and, in the case in which methane is the hydrocarbon, proceeds by the following reaction:

$$2CH_4 + O_2 \rightarrow 2CO + 4H_2$$

The optimum catalytic partial oxidation process for application on a commercial scale would give high yields of carbon monoxide and hydrogen at elevated pressures, for example about 30 bar, and very high space velocities, for example of the order of 1,000,000 Nl/kg/h. For thermodynamic reasons, in order to obtain high yields of carbon monoxide and hydrogen under these process conditions, it is necessary to operate the partial oxidation process at high temperatures.

The literature contains a number of documents disclosing details of experiments conducted into the catalytic partial oxidation of hydrocarbons, in particular methane, employing a wide range of catalysts. The majority of these experiments, however, have been conducted under very mild conditions or under conditions wholly unsuited to the operation of a commercial catalytic partial oxidation process.

Thus, European Patent Application publication No. 0 303 438 (EP-A-0 303 438) discloses a process for the catalytic partial oxidation of a hydrocarbonaceous feedstock in which a gaseous mixture of the hydrocarbonaceous feedstock, oxygen or an oxygen-containing gas and, optionally, steam, is introduced into a catalytic partial oxidation zone to contact a catalyst retained therein. The catalyst employed in the process may comprise a wide range of catalytically active components, for example palladium, platinum, rhodium, iridium, osmium, ruthenium, nickel, chromium, cobalt, cerium, lanthanum and mixtures thereof. Further, it is stated in EP-A-0 303 438 that materials not normally considered to be catalytically active may also be employed as catalysts, for example refractory oxides such as cordierite, mullite, mullite aluminum titanate, zirconia spinels and alumina. The catalyst may be of a variety of forms, for example sheets of corrugated metal packed to form elongate channels therethrough or wire mesh. However, preference is given in EP-A-0 303 438 to the use of catalysts in the form of monoliths.

European Patent No. 0 262 947 (EP-B-0 262 947) discloses a process for generating hydrogen by the partial oxidation of a hydrocarbon in which a mixture of the hydrocarbon and oxygen is injected into a mass of a catalyst. The catalyst disclosed in EP-B-0 262 947 comprises platinum and chromium oxide supported on a refractory solid.

D. A. Hickman and L. D. Schmidt ("Synthesis Gas Formation by Direct Oxidation of Methane over Pt Monoliths", Journal of Catalysis 138, 267–282, 1992)) have conducted experiments into the partial oxidation of methane in the presence of catalysts comprising either platinum or rhodium. The catalysts employed were in the form of a polycrystalline platinum foil or rhodium or platinum supported on a ceramic foam carrier. The partial oxidation reactions were conducted at substantially atmospheric pressure and at temperatures in the range of from 600 to 1500 K (337° to 1237° C.).

A. T. Ashcroft et al. ("Selective oxidation of methane to synthesis gas using transition metal catalysts", Nature, vol. 344, No. 6264, pages 319 to 321, 22nd Mar., 1990) disclose the partial oxidation of methane to synthesis gas in the presence of a range of ruthenium-containing the partial oxidation of methane to synthesis gas in the presence of a range of ruthenium-containing catalysts. The objective of the experiments was to establish that the partial oxidation process could be carried out under mild conditions and at low temperatures. To this end, the experiments were conducted with a low gas hourly space velocity of 40,000/hr, a pressure of 1 atmosphere and a temperature of about 777° C. A single experiment is reported in which elevated pressures were applied. However, in this case, a large excess of methane was used in order to avoid the risk of explosions.

P. D. F. Vernon et al. ("Partial Oxidation of methane to Synthesis Gas", Catalysis Letters 6 (1990) 181–186) disclose a range of experiments in which catalysts comprising nickel, ruthenium, rhodium, palladium, iridium or platinum, either supported on alumina or present in mixed oxide precursors, were applied. Again, the experiments reported are limited to a catalytic partial oxidation process employing only mild operating conditions. As a basis, a set of mild reaction conditions were selected: a pressure of 1 atmosphere, a gas hourly space velocity of 40,000/hr, a temperature of 1050K (777° C.) and a methane/oxygen ratio of 2.0. From this basis, each of the process parameters was explored. From this study it was concluded that the low temperature operation gave certain operating advantages, but was only practicable at pressures of the order of 1 atmosphere. The authors report the same experiments in "Partial Oxidation of Methane to Synthesis Gas, and Carbon Dioxide as an Oxidizing Agent for Methane Conversion", Catalysis Today, 13 (1992) 417–426.

R. H. Jones et al. ("Catalytic Conversion of Methane to Synthesis Gas over Europium Iridate, Eu2Ir2O7", Catalysis Letters 8 (1991) 169–174) report the selective partial oxidation of methane using the europium iridium pyrochlore Eu2Ir2O7. The reaction was studied under the mild conditions of a pressure of 1 atmosphere and a temperature of 873K (600° C.).

J. K. Hockmuth ("Catalytic Partial Oxidation of Methane over a monolith Supported Catalyst", Applied Catalysis B: Environmental, 1 (1992)89–100) reports the catalytic partial oxidation of methane using a catalyst comprising a combination of platinum and palladium supported on a cordierite monolith body.

U.S. Pat. No. 5,149,464 is directed to a method for selectively oxygenating methane to carbon monoxide and hydrogen by bringing the reactant gas mixture at a temperature of about 650° C. to 900° C. into contact with a solid catalyst which is generally described as being either:

a) a catalyst of the formula MxM'yOz, where:

M is at least one element selected from Mg, B, Al, Ln, Ga, Si, Ti, Zr and Hf; Ln is at least one member of lanthanum and the lanthanide series of elements;

M' is a d-block transition metal, and each of the ratios x/y and y/z and (x+y)/z is independently from 0.1 to 8; or b) an oxide of a d-block transition metal; or c) a d-block transition metal on a refractory support; or

3 d) a catalyst formed by heating a) or b) under the conditions of the reaction or under non-oxidizing conditions.

The d-block transition metals are said in U.S. Pat. No. 5,149,464 to be selected from those having atomic number 21 to 29, 40 to 47 and 72 to 79, the metals scandium, titanium, vanadium, chromium, manganese, iron, cobalt, nickel, copper, zirconium, niobium, molybdenum, technetium, ruthenium, rhodium, palladium, silver, hafnium, tantalum, tungsten, rhenium, osmium, iridium, platinum and gold. It is stated in U.S. Pat. No. 5,149,464 that the preferred metals are those in Group VIII of the Periodic Table of the Elements, that is iron, osmium, cobalt, rhenium, iridium, palladium platinum, nickel and ruthenium.

The process described in U.S. Pat. No. 5,149,464 is operated at a temperature in the range of from 650° C. to 900° C., with a range of from 700° C. to 800° C. being preferred. A range of experiments are described in U.S. Pat. No. 5,149,464 in which a variety of catalysts comprising Group VIII metals were tested, including ruthenium oxide, praesidium/ruthenium oxides, pyrochlores, ruthenium on alumina, rhodium on alumina, palladium on alumina, platinum on alumina, nickel/aluminum oxide, perovskites and nickel oxide.

A similar general disclosure of a catalyst for use in the catalytic partial oxidation process is made in International Patent Application publication No. WO 92/11199. WO 92/11199 specifically discloses experiments in which catalysts comprising iridium, palladium, ruthenium, rhodium, nickel and platinum supported on alumina were applied. All the experiments were conducted under mild process conditions, with typical conditions being a pressure of 1 atmosphere, a temperature of 1050 K (777° C.) and a gas hourly space velocity of about 20,000/hr.

As discussed hereinbefore, to be effective on a commercial scale, the catalytic partial oxidation process would need to operate at elevated pressures and at high temperatures. It has now been found that, when operated under the conditions demanded of a commercial process, the catalytic partial oxidation of hydrocarbons can, in the presence of nitrogen, yield a synthesis gas product containing a number of by-products, in particular ammonia (NH3) and hydrogen cyanide (HCN), in low but significant amounts. It has been found that such by-products can adversely affect downstream processes to convert the carbon monoxide and/or hydrogen produced by the catalytic partial oxidation process, e.g. in the case of Fischer-Tropsch synthesis or of the commercial synthesis of methanol. The presence of by-products, in particular ammonia or hydrogen cyanide, in the products of the catalytic partial oxidation process is thus undesirable.

Nitrogen is present in many natural gas feedstocks. Further, the preparation of pure, nitrogen-free oxygen on a commercial scale is both technically complex and very expensive. Accordingly, there is a need for a process for the catalytic partial oxidation of hydrocarbons when nitrogen is present during the partial oxidation reactions which may be applied on a commercial scale to produce a product of carbon monoxide and/or hydrogen containing a minimum of components such as ammonia and hydrogen cyanide.

Surprisingly, it has been found that the inclusion of sulfur or sulfur-containing compounds in the feed to the catalytic partial oxidation process significantly reduces the amounts of ammonia and hydrogen cyanide produced.

SUMMARY OF THE INVENTION

The present invention provides a process for the catalytic partial oxidation of a hydrocarbon feedstock, which process comprises contacting a feed mixture comprising the hydrocarbon feedstock and an oxygen-containing gas, which feed mixture also comprises nitrogen, with a catalyst capable of catalyzing the partial oxidation of the hydrocarbon feedstock, wherein the feed mixture also comprises a sulfur-containing compound.

DETAILED DESCRIPTION OF THE INVENTION

Figure 1:
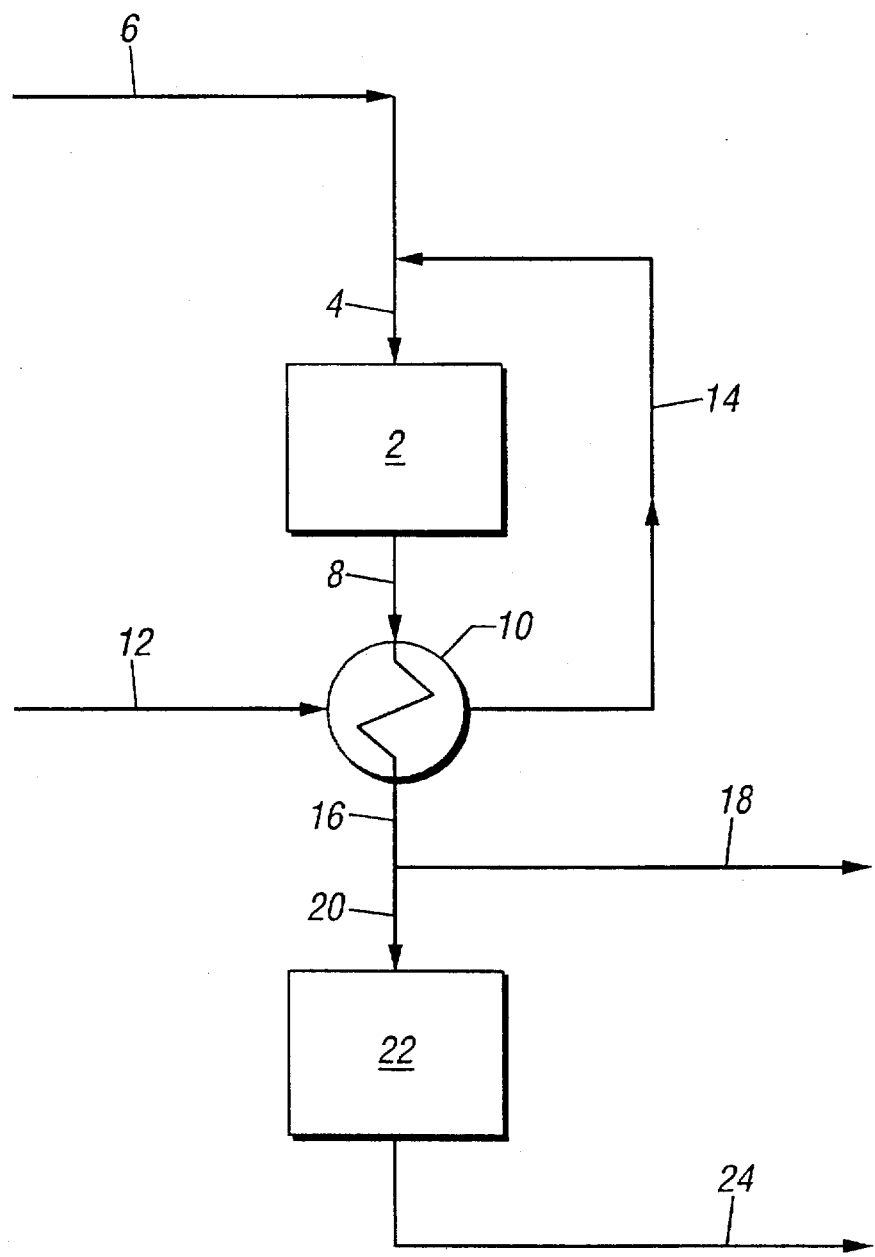
FIG. 1 which is a schematic representation of one embodiment of the process for the catalytic partial oxidation of a sulfur containing hydrocarbon feedstock.

The process of the present invention may be used to prepare carbon monoxide and/or hydrogen from any gaseous hydrocarbon or hydrocarbon having a low boiling point such that it is gaseous under the conditions prevailing during the partial oxidation reactions. The process is particularly suitable for the partial oxidation of methane, natural gas, associated gas or other sources of light hydrocarbons. In this respect, the term "light hydrocarbons" is a reference to hydrocarbons having from 1 to 5 carbon atoms. The process may be applied in the conversion of naturally occurring reserves of methane which contain a substantial amount of carbon dioxide. The feed preferably comprises methane in an amount of at least 50% by volume, more preferably at least 75% by volume, especially at least 80% by volume.

The hydrocarbon feedstock is contacted with an oxygen-containing gas during the partial oxidation process. Air may be used as the oxygen-containing gas, in which case nitrogen will be present in the feed and reaction mixture in large quantities. Alternatively, the use of substantially pure oxygen may be preferred, in which case nitrogen may be present in much lower, but nevertheless significant, quantifies. Typically, the substantially pure oxygen is prepared on a commercial scale by the distillation of liquefied air. The amount of nitrogen present in the substantially pure oxygen will depend upon the operating conditions of the air distillation process. It is an advantage of the process of the present invention that the tolerances of the air distillation process may be relaxed, thereby allowing a greater amount of nitrogen to be present in the substantially pure oxygen being used in the catalytic partial oxidation process. This, in turn, offers advantages in terms of a reduction in the overall capital and operating costs of the air distillation plant.

The feed may optionally comprise steam.

The feed may comprise the hydrocarbon feedstock and oxygen in an amount sufficient to give a suitable oxygen-to-carbon ratio. Preferably, the oxygen-to-carbon ratio is in the range of from 0.3 to 0.8, more preferably from 0.45 to 0.75. References to the oxygen-to-carbon ratio refer to the ratio of oxygen in the form of molecules ($O_2$) to carbon atoms present in the hydrocarbon feedstock. Preferably, the oxygen-to-carbon ratio is in the range of from 0.45 to 0.70, with oxygen-to-carbon ratios of the stoichiometric ratio, 0.5, that is in the range of from 0.45 to 0.65, being particularly suitable.

If steam is present in the feed, the steam-to-carbon ratio (that is the ratio of molecules of steam ($H_2O$) to carbon atoms in the hydrocarbon) is preferably in the range of from above 0.0 to 3.0, more preferably from above 0.0 to 2.0.

The gaseous mixture contacted with the catalyst in the process of this invention comprises a sulfur-containing compound. The mixture may comprise one or a plurality of sulfur-containing compounds. Any suitable sulfur-containing compound may be employed which does not give rise to a significant adverse effect to the performance of the partial oxidation reaction when present in the required amount. Both organic and inorganic sulfur-containing compounds may be employed. Suitable inorganic sulfur compounds include hydrogen sulfide, carbonyl sulfide, carbon disulfide. Suitable organic sulfur-containing compounds include the thiophenes, mercaptans and sulfides. A most suitable sulfur-containing compound is tetrahydrothiophene. If natural gas or associated gas are being employed, sulfur-containing compounds may be present in the gas as it is produced from the reservoir. Such sulfur-containing hydrocarbon feedstocks may conveniently be used as a feed to the process of the present invention without first undergoing a desulfurization treatment, such as is conventionally applied.

The sulfur-containing compound should be present in the feed mixture in a sufficient concentration to reduce the formation of ammonia and hydrogen cyanide. However, the quantity of the sulfur-containing compound should not be so great as to significantly reduce either the activity or the selectivity of the catalyst being employed. Thus, the sulfur-containing compound is preferably present in the feed mixture in an amount to give a sulfur (S) content in the range of from 0.05 to 100 ppm, more preferably from 0.1 to 50 ppm, especially from 0.1 to 10 ppm. Hydrocarbon feedstocks used directly from naturally occurring reservoirs in which the sulfur content is significantly above the aforementioned upper limits may preferably be subjected to a partial sulfur removal treatment before being employed in the process of this invention.

The hydrocarbon feedstock, oxygen and its associated gases, the sulfur-containing compound and the steam, if present, are preferably well mixed prior to being contacted with the catalyst.

The process of the present invention may be operated at any suitable pressure. Preferably, the process of the present invention is operated at elevated pressures, that is pressures significantly above atmospheric pressure. The process may be operated at pressures in the range of up to 150 bar. Preferably, the operating pressure is in the range of from 2 to 125 bar, more preferably from 3 to 100 bar.

The process may be operated at any suitable temperature. However, under the conditions of high pressure prevailing in the process, it is necessary to allow the feed gases to contact the catalyst at elevated temperatures in order to achieve the level of conversion required for a commercial scale operation. Accordingly, the process is preferably operated at a temperature of at least 950° C. Preferably, the operating temperature is in the range of from 950° to 1300° C., more preferably in the range of from 950° to 1200° C. Temperatures in the range of from 1000° to 1200° C. are particularly suitable.

The feed mixture may be provided during the process at any suitable gas space velocity. It is an advantage of the process of the present invention that very high gas space velocities may be applied. Thus, typical space velocities for the process (expressed as normal liters of gas per kilogram of catalyst per hour) are in the range of from 20,000 to 100,000,000 Nl/kg/hr, more preferably in the range of from 50,000 to 50,000,000 Nl/kg/hr. Space velocities in the range of from 500,000 to 30,000,000 Nl/kg/hr are particularly suitable.

Catalyst compositions suitable for use in the catalytic partial oxidation of hydrocarbons are known in the art. Preferred catalysts for use in the process of the present invention comprise, as the catalytically active component, a metal selected from Group VIII of the Periodic Table of the Elements. References in this specification to the Periodic Table of the Elements are to the CAS version, as published in the CRC Handbook of Chemistry and Physics, 68th Edition. Preferred catalysts for use in the process comprise a metal selected from ruthenium, rhodium, palladium, osmium, iridium and platinum. Catalysts comprising ruthenium, rhodium or iridium as the catalytically active metal are most suitable for use in the process.

The catalytically active metal is most suitably supported on a carrier. Suitable carrier materials are well known in the art and include the refractory oxides, such as silica, alumina, titania, zirconia and mixtures thereof. Mixed refractory oxides, that is refractory oxides comprising at least two cations may also be employed as carrier materials for the catalyst.

The catalytically active metal may be deposited on the refractory oxide carrier by techniques well known in the art. A most suitable technique for depositing the metal on the carrier is impregnation, which technique typically comprises contacting the carrier material with a solution of a compound of the catalytically active metal, followed by drying and calcining the resulting material.

The catalyst may comprise the catalytically active metal in any suitable amount to achieve the required level of activity. Typically, the catalyst comprises the active metal in an amount in the range of from 0.01 to 20% by weight, preferably from 0.02 to 10% by weight, more preferably from 0.1 to 7.5% by weight.

Any suitable reaction regime may be applied in the process of the present invention in order to contact the reactants with the catalyst. One suitable regime is a fluidized bed, in which the catalyst is employed in the form of particles fluidized by a stream of gas. A preferred reaction regime for use in the process is a fixed bed reaction regime, in which the catalyst is retained within a reaction zone in a fixed arrangement. Particles of catalyst may be employed in the fixed bed regime, retained using fixed bed reaction techniques well known in the art. Alternatively, the fixed arrangement may comprise the catalyst in the form of a monolithic structure. A most preferred monolithic structure comprises a ceramic foam. Suitable ceramic foams for use in the process are available commercially. Further, alternative forms for the catalyst include refractory oxide honeycomb monolith structures.

In a preferred embodiment of the process of this invention, the feed is contacted with a catalyst retained in a fixed arrangement, which arrangement has a high tortuosity. The term "tortuosity" is a common term in the art which, when referring to a fixed catalyst bed, can be defined as the ratio of the length of the path taken by a gas flowing through the bed to the length of the shortest straight line path through the bed. Thus, the honeycomb monolith structures have a tortuosity of 1.0. For the purposes of the present invention, the term "high tortuosity" is a reference to arrangements having a tortuosity substantially greater than that of the honeycomb monolith structures, in particular a tortuosity of at least 1.1. A fixed bed of catalyst particles typically has a tortuosity of 1.5, whilst ceramic foams may be prepared having a tortuosity in the range of from 3.0 to 4.0, or even higher. In general, the tortuosity of the fixed bed arrangement is preferably in the range of from 1.1 to 10.0, more preferably to 5.0. A most suitable range of tortuosity is from 1.3 to 4.0.

It has been found that by employing the catalyst in a fixed bed arrangement having a high tortuosity allows the required conversion to be achieved with only a relatively very short contact time between the reacting gases and the catalyst. In this way, only a very low volume of catalyst is required, which in turn allows the very high gas space velocities of the present process to be easily achieved on a commercial scale.

It is a further preferred feature of the process of this invention that the catalyst is retained in the form of a fixed arrangement having a large number of pores. In this respect, the term "pore" is a general reference to a space or interstice in the fixed arrangement between two adjacent portions of the catalyst. Thus, in the case of a fixed bed of catalyst particles, the term "pore" refers to the space between two adjacent particles. When referring to ceramic foams, the term pore refers to the openings or spaces between adjacent portions or lands of the ceramic structure. Thus, it will be appreciated that the pores referred to in respect of the present invention have a nominal diameter of the order of magnitude of 0.1 mm. These are to be contrasted with pores which material itself, which may be porous.

The fixed arrangement comprises at least 750 pores per square centimeter. Preferably, the fixed arrangement comprises from about 1000 to about 15000 pores per square centimeter, more preferably from about 1250 to about 10000 pores per square centimeter.

The gaseous mixture of the hydrocarbon feedstock and the oxygen-containing gas are preferably contacted with the catalyst under adiabatic conditions. For the purposes of this specification, the term "adiabatic" is a reference to reaction conditions in which substantially all heat loss and radiation from the reaction zone is prevented, with the exception of heat leaving in the gaseous effluent stream of the reactor.

In a further aspect, the present invention relates to carbon monoxide or hydrogen whenever prepared by a process as hereinbefore described.

The mixture of carbon monoxide and hydrogen prepared by the process of this invention is particularly suitable for use in the synthesis of hydrocarbons, for example by means of the Fischer-Tropsch synthesis, or the synthesis of oxygenates, for example methanol. Processes for the conversion of the mixture of carbon monoxide and hydrogen into such products are well known in the art.

As mentioned hereinbefore, it is an advantageous aspect of the present invention that naturally occurring hydrocarbon sources which also comprise sulfur or sulfur-containing compounds may be subjected to catalytic partial oxidation without the need to treat the hydrocarbon feedstock to a sulfur removal stage. This is in contrast to the conventional processing of naturally occurring hydrocarbon feedstocks, such as natural or associated gas, which are subjected to a desulfurization treatment before use. Thus, it follows that sulfur removal need only be applied if the carbon monoxide and/or hydrogen products of the process are to be utilized in applications which are sensitive to the presence of sulfur, such as Fisher-Tropsch synthesis. In such cases, the sulfur removal treatment may be applied to the product stream of the catalytic partial oxidation process.

Accordingly, in a further aspect, the present invention provides a process for the preparation of carbon monoxide and/or hydrogen from a hydrocarbon feedstock comprising subjecting the hydrocarbon feedstock in a first stage to a catalytic partial oxidation process as hereinbefore described and subjecting at least a portion of the product of the first stage in a second stage to a desulfurization process.

Referring to FIG. 1, a catalytic partial oxidation reactor 2 is supplied via line 4 with a feed mixture comprising substantially pure oxygen and a sulfur-containing natural gas. The substantially pure oxygen comprises a minor amount of nitrogen and is prepared by the distillation of liquefied air in a distillation unit (not shown) linked to the catalytic partial oxidation processing unit by line 6. The hot product stream of the catalytic partial oxidation reactor 2 is led via line 8 to a heat exchanger 10, in which the hot product stream is used to preheat natural gas fed to the heat exchanger by line 12. The preheated natural gas feed is supplied to the inlet of the catalytic partial oxidation reactor via line 14.

The cooled product stream of the catalytic partial oxidation reactor is removed from the heat exchanger via line 16. A product stream comprising carbon monoxide and hydrogen is withdrawn from the process via line 18 to be employed as a feed for sulfur-tolerant applications (not shown). A portion of the cooled product stream is supplied via line 20 to a desulfurization unit 22. A substantially sulfur-free product stream is removed from the desulfurization unit 22 via line 24 for supply to sulfur-sensitive applications.

Suitable processes for use in the desulfurization unit for removing sulfur-containing components from the carbon monoxide/hydrogen product are well known in the art. Suitable techniques include adsorption of the sulfur-containing compounds by passing the product stream through a bed of a suitable adsorbent, for example active carbon or zinc oxide.

The process of the present invention is further described by way of the following examples which are for illustrative purposes only and are not intended to limit the scope of the present invention. Examples 1 and 2 are embodiments of the present invention and Example 3 is for comparative purposes only.

EXAMPLES

Example 1

Catalyst Preparation

Barium hexa-aluminate ($BaAl_{12}O_{19}$) was prepared as follows:

Barium (21.0 g) was added to isopropyl alcohol (1500 ml) under an atmosphere of nitrogen and the resultant mixture heated under reflux for 1.5 hours. Further isopropyl alcohol (1000 ml) was added to the resulting solution. Thereafter, aluminum isopropylate (379.65 g) was added stepwise and the mixture heated under reflux for a period of 5 hours. The resulting mixture (601.87 g) was combined with demineralized water (22.5 g) and heated under reflux whilst stirring for a further 1 hour. The resulting solution was subsequently heated to evaporate the solvent to leave a solid residue. The solid was dried by heating to 120° C. and maintained at that temperature for 4 hours. Thereafter, the solid was calcined in a first stage by heating to 450° C. over a period of 4 hours and being held at that temperature for 1 hour and in a second stage by heating to 1300° C. over a period of 1 hour and being held at that temperature for 5 hours.

An aqueous solution was prepared by dissolving rhodium chloride ($RhCl_3$, 2.0 g) and hydrochloric acid (37%, 1.0 g) in demineralized water (6.83 g) to give a rhodium concentration of 10% by weight. The barium hexa-aluminate prepared as described hereabove (30/80 mesh, 2.0 g) was immersed in the aforementioned aqueous solution (1.07 g). The resulting mixture was agitated firstly in a rolling mill for 1 hour and thereafter in a rotary drier for 1 hour. The resulting material was dried in an oven by heating for 1 hour and being held at a temperature of 120° C. for 5 hours and subsequently calcined by heating for 5 hours and being held at a temperature of 500° C. for 1 hour. The resulting catalyst comprised 5.0% by weight rhodium.

Catalytic Partial Oxidation

A reactor was constructed comprising a transparent sapphire tube mounted concentrically within an outer transparent polycarbonate tube. The rhodium-containing catalyst prepared as hereinbefore described was loaded into the sapphire tube and retained in the form of a fixed bed of catalyst particles having a tortuosity of 1.5. A feed mixture comprising methane and oxygen, in sufficient amounts to give an oxygen-to-carbon ratio of 0.63, was thoroughly mixed just before being introduced into the reactor to contact the fixed bed of catalyst. The feed mixture was fed to the reactor at a pressure of 3.2 bara and at a gas hourly space velocity (GHSV) of 1,400,000 Nl/kg/hr. The feed mixture comprised 10% by volume of nitrogen. Tetrahydrothiophene was present in the feed mixture in an amount sufficient to give a sulfur (S) concentration of 4.5 ppmv.

The operating temperature of the catalyst bed was measured by optical pyrometry. The composition of the gas mixture leaving the reactor was measured by gas chromatography. The conversion and the selectivity of the process to carbon monoxide and hydrogen (on the basis of methane converted) was determined. The ammonia content of the product gas was determined by passing the gas stream through an aqueous solution of sulfuric acid to remove the ammonia, followed by titration of the solution. The hydrogen cyanide content was determined in a similar manner using an aqueous solution of potassium hydroxide.

The operating conditions of the reactor and the results of the experiment are summarized in the Table hereinbelow.

Example 2

The catalyst preparation and process method described in Example 1 was followed, with the exception that tetrahydrothiophene was present in the feed mixture in an amount sufficient to give a sulfur (S) concentration of 0.6 ppm. The operating conditions of the reactor and the results of the experiment are summarized in the Table hereinbelow.

Example 3

Comparative Example

The catalyst preparation and process method described in Example 1 was followed, with the exception that the feed mixture was sulfur free. The operating conditions of the reactor and the results of the experiment are summarized in the Table hereinbelow.

TABLE

| | Example 1 | Example 2 | Example 3 |
|---|---|---|---|
| Feed composition | | | |
| $N_2$ content (% vol) | 10 | 10 | 10 |
| S content (ppmv)[1] | 4.5 | 0.6 | 0.0 |
| oxygen/carbon ratio | 0.63 | 0.63 | 0.63 |
| Operating Conditions | | | |
| Pressure (bara) | 3.2 | 3.2 | 3.2 |
| GHSV (1000 Nl/kg/hr) | 1400 | 1400 | 1400 |
| Product Stream | | | |
| $NH_3$ content (ppmv) | 0.6[2] | 2.3[2] | 10.0[2] |
| HCN content (ppmv) | <0.1 | <0.1 | 1.0[3] |

[1] present as tetrahydrothiophene
[2] accuracy +/− 0.5 ppmv
[3] accuracy +/− 0.1 ppmv

What is claimed is:

1. A process for the catalytic partial oxidation of a hydrocarbon feedstock comprising methane, natural gas, associated gas or a source of light hydrocarbons, which process comprises contacting a feed mixture comprising the hydrocarbon feedstock and an oxygen-containing gas, which feed mixture also comprises nitrogen, with a catalyst capable of catalyzing the partial oxidation of the hydrocarbon feedstock, wherein the feed mixture also comprises a sulfur-containing compound selected from the group consisting of hydrogen sulfide, sulfur dioxide, carbonyl sulfide, a mercaptan, an organic sulfide, a thiophene, and mixtures thereof, to produce carbon monoxide and/or hydrogen.

2. The process of claim 1 wherein the oxygen-containing gas is substantially pure oxygen.

3. The process of claim 1 wherein the feed mixture comprises the hydrocarbon feedstock and the oxygen-containing gas in amounts giving an oxygen-to-carbon ratio of from 0.3 to 0.8.

4. The process of claim 1 wherein the sulfur-containing compound is present in an amount of from 0.05 to 100 ppm.

5. The process of claim 1 wherein the feed is contacted with the catalyst at a pressure in the range of up to 150 bar.

6. The process of claim 1 wherein the feed is contacted with the catalyst at a temperature in the range of from 950° to 1300° C.

7. The process of claim 1 wherein the feed is contacted with the catalyst at a gas hourly space velocity in the range of from 20,000 to 100,000,000 Nl/kg/hr.

8. The process of claim 1 wherein the catalyst comprises rhodium, ruthenium or iridium.

9. The process of claim 1 wherein the catalyst is retained in a fixed arrangement.

10. The process of claim 9, wherein the fixed arrangement of the catalyst has a tortuosity in the range of from 1.1 to about 10.0.

11. The process of claim 9 wherein the fixed arrangement of the catalyst has from about 1000 to about 15000 pores per square centimeter.

12. The process of claim 1 wherein the feed is contacted with the catalyst under substantially adiabatic conditions.

13. A process for the preparation of carbon monoxide and/or hydrogen from a hydrocarbon feedstock comprising methane, natural gas, associated gas or a source of light hydrocarbons, which feedstock contains sulfur or sulfur-containing compounds, the process comprising subjecting the feedstock in a first stage to a catalytic partial oxidation process comprising contacting a feed mixture comprising the hydrocarbon feedstock, an oxygen-containing gas, and a sulfur-containing compound selected from the group consisting of hydrogen sulfide, sulfur dioxide, carbonyl sulfide, a mercaptan, an organic sulfide, a thiophene, and mixtures thereof with a catalyst capable of catalyzing the partial oxidation of the hydrocarbon feedstock to yield a first stage product and subjecting at least a portion of the first stage product in a second stage to a desulfurization process.

14. A process for the preparation of carbon monoxide and/or hydrogen, which process comprises contacting at elevated temperature and pressure a mixture comprising oxygen, nitrogen, a feedstock selected from the group consisting of methane, natural gas, associated gas and light hydrocarbons, and a sulfur-containing compound selected from the group consisting of hydrogen sulfide, sulfur dioxide, carbonyl sulfide, a mercaptan, an organic sulfide, a thiophene, and mixtures thereof with a catalyst comprising a catalytically active metal selected from the group consisting of rhodium, ruthenium, and iridium, which catalyst is retained in a fixed arrangement having a high tortuosity.

* * * * *